(12) United States Patent
Kazar et al.

(10) Patent No.: US 7,454,567 B2
(45) Date of Patent: Nov. 18, 2008

(54) METHOD AND APPARATUS FOR DATA STORAGE USING STRIPING

(75) Inventors: Michael L. Kazar, Pittsburgh, PA (US); Richard N. Sanzi, Jr., Wexford, PA (US)

(73) Assignee: Spinnaker Networks, LLC, Pittsburgh, PA (US)

( * ) Notice: Subject to any disclaimer, the term of this patent is extended or adjusted under 35 U.S.C. 154(b) by 0 days.

(21) Appl. No.: 11/888,166

(22) Filed: Jul. 31, 2007

(65) Prior Publication Data

US 2007/0271350 A1   Nov. 22, 2007

(51) Int. Cl.
*G06F 12/16* (2006.01)
*G06F 12/08* (2006.01)
*G06F 17/30* (2006.01)

(52) U.S. Cl. .................. 711/114; 707/201; 711/118
(58) Field of Classification Search ............... None
See application file for complete search history.

(56) References Cited

U.S. PATENT DOCUMENTS

| | | | |
|---|---|---|---|
| 5,701,516 A | | 12/1997 | Cheng et al. |
| 5,893,140 A | * | 4/1999 | Vahalia et al. ............ 711/118 |
| 6,032,216 A | | 2/2000 | Schmuck et al. |
| 6,324,581 B1 | | 11/2001 | Xu et al. |
| 6,697,846 B1 | | 2/2004 | Soltis |
| 2002/0083120 A1 | | 6/2002 | Soltis |
| 2004/0139167 A1 | | 7/2004 | Edsall et al. |
| 2005/0044080 A1 | * | 2/2005 | Fridella et al. ............ 707/10 |

OTHER PUBLICATIONS

Robert B. Ross et al., "Using the Parallel Virtual File System," (Jul. 2002).
Examiner, "PVFS: A Parallel File System for Linux Cluster," Proceeding of the 4th Annual Linux Showcase and Conference, p. 317-327, (Oct. 2000).
W. B. Ligon III et al., "Implementation and Performance of a Parallel File System for High Performance Distributed Application," Proceedings of the 5th IEEE International Symposium on High Performance Distributed Computing, (Aug. 1996).
P.H. Carns et al., "PVFS: A Parallel File System for Linux Clusters," Proceedings of the 4th Annual Linux Showcase and Conference, p. 317-237, (Oct. 2000).

* cited by examiner

*Primary Examiner*—H. S. Sough
*Assistant Examiner*—Duc T Doan
(74) *Attorney, Agent, or Firm*—Ansel M. Schwartz

(57) ABSTRACT

An apparatus for data storage includes a cluster of NFS servers. Each server has network ports for incoming file system requests and cluster traffic between servers. The apparatus includes a plurality of storage arrays in communication with the servers. The servers utilize a striped file system for storing data. A method for data storage. A method for establishing storage for a file. A method for removing a file from storage. A method for reading data in a file. A method for writing data in a file.

3 Claims, 5 Drawing Sheets

READ DATA PATH

READ DATA PATH

CREATE/DELETE/TRUNCATE DATA PATH ated with the file. The servers utilize a striped file system for
METHOD AND APPARATUS FOR DATA STORAGE USING STRIPING

FIELD OF THE INVENTION

The present invention is related to the storage of data using striping with NFS servers. More specifically, the present invention is related to the storage of data using striping with NFS servers where ranges of attributes including modification times and change times are taken into account.

BACKGROUND OF THE INVENTION

An important problem in data storage is providing shared file access for a compute cluster comprised of many independent processors connected via a high speed network. In a number of interesting cases, the compute cluster is accessing a single file, and in this case, it is a challenging to provide sufficient bandwidth from the entire compute cluster to this single file.

Previous approaches to this problem follow one of two architectures. In one class of solution, implemented by Sistina and PolyServe, for example, bandwidth to a single file is scaled by providing multiple servers that coordinate their access to the logical storage array (LUN) holding the file. These systems perform a complex distributed locking scheme to coordinate access to the LUN, coordinating, specifically, such operations such as disk block allocation, allocation of blocks to files, allocating inode numbers to files, and building indirect block trees. These systems are typically inefficient, as their locking overhead is very high.

In another class of solution, typified by the PVFS system, data is striped among multiple servers through an additional file system layer built on top of a normal file system. In PVFS, updates to the various strip files in the resulting file system are not coordinated very closely, and operations that deal with global file properties, such as the file length, are implemented very expensively, or via approximations that may cause application errors. For example, in PVFS, determining the length of a file requires reading the individual file lengths from all of the strips, and taking the largest returned result, an expensive procedure. Similarly, an accurate modification time is important for file systems whose data is exported via the Network File System (NFS) protocol, which uses the file's modification time as a version number. But PVFS, and similar parallel file systems, return the modification time for a file via a similar procedure to that returning the file length: they check with all servers and return the largest modification time field. Since the different servers have clocks that differ by no less than small numbers of microseconds, it is possible for a write to be performed at the server responsible for one stripe that happens to have the furthest advanced clock, and then perform a write to another server with an older clock, with the result that the second write does not advance the system wide file modification time. Having two versions of the file with the same modification time may cause incorrect behavior by protocols like NFS that use modification times as version numbers. Because of these problems, PVFS file systems are unsuitable for export over a network with NFS.

This invention differs from the current art by providing a solution that combines the efficient locking of a striped solution like PVFS with correct and efficient file attribute retrieving required for exporting data with NFS.

SUMMARY OF THE INVENTION

The present invention pertains to an apparatus for data storage. The apparatus comprises a cluster of NFS servers. Each server has network ports for incoming file system requests and cluster traffic between servers. The apparatus comprises a plurality of storage arrays in communication with the servers. The servers utilize a striped file system for storing data.

The present invention pertains to a method for data storage. The method comprises the steps of creating a file across a plurality of NFS servers. There is the step of writing data into the file as strips of the data in the servers, the strips together forming a stripe. There is the step of reading strips of the data from the servers. There is the step of deleting the strips from the servers.

The present invention pertains to a method for establishing storage for a file. The method comprises the steps of receiving an NFS create request at a network element. There is the step of receiving a file create request at a meta-data server from the network element. There is the step of allocating an inode number for the file at the meta-data server. There is the step of making create calls to input output secondaries to mark the file as allocated by the input output secondaries. There is the step of committing the file create at the meta-data server.

The present invention pertains to a method for removing a file from storage. The method comprises the steps of receiving a delete file request at a meta-data server. There is the step of removing a file name of the file from a parent directory by the meta-data server at the meta-data server. There is the step of putting the file name on a file delete list by the meta-data server at the meta-data server. There is the step of sending delete calls to the input output secondaries. There is the step of receiving at the meta-data server acknowledgment calls from the input output secondaries that they have deleted the file. There is the step of deleting the file at the meta-data server. There is the step of deleting the file from the file delete list. There is the step of placing an inode number associated with the file into a free list by the meta-data server at the meta-data server.

The present invention pertains to a method for reading data in a file. The method comprises the steps of receiving an NFS read request for data in the file at a network element. There is the step of determining by the network element which VFS stores at least one strip containing the data. There is the step of sending a file read request from the network element to at least one disk element of a plurality of servers storing a strip of the data. There is the step of obtaining current attributes associated with the file by each disk element. There is the step of reading the strips of the file from each disk element having the strips. There is the step of generating a response in regard to the file read request.

The present invention pertains to a method for writing data in a file. The method comprises the steps of receiving an NFS write request for a file at a network element. There is the step of determining by the network element which VFS is associated with the file. There is the step of sending a file write request from the network element to at least one disk element of a plurality of servers having a stripe of the VFS. There is the step of acquiring current attributes associated with the file. There is the step of writing a predetermined number of bytes of the data into each VFS strip in succession until all of the data is written into the file.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
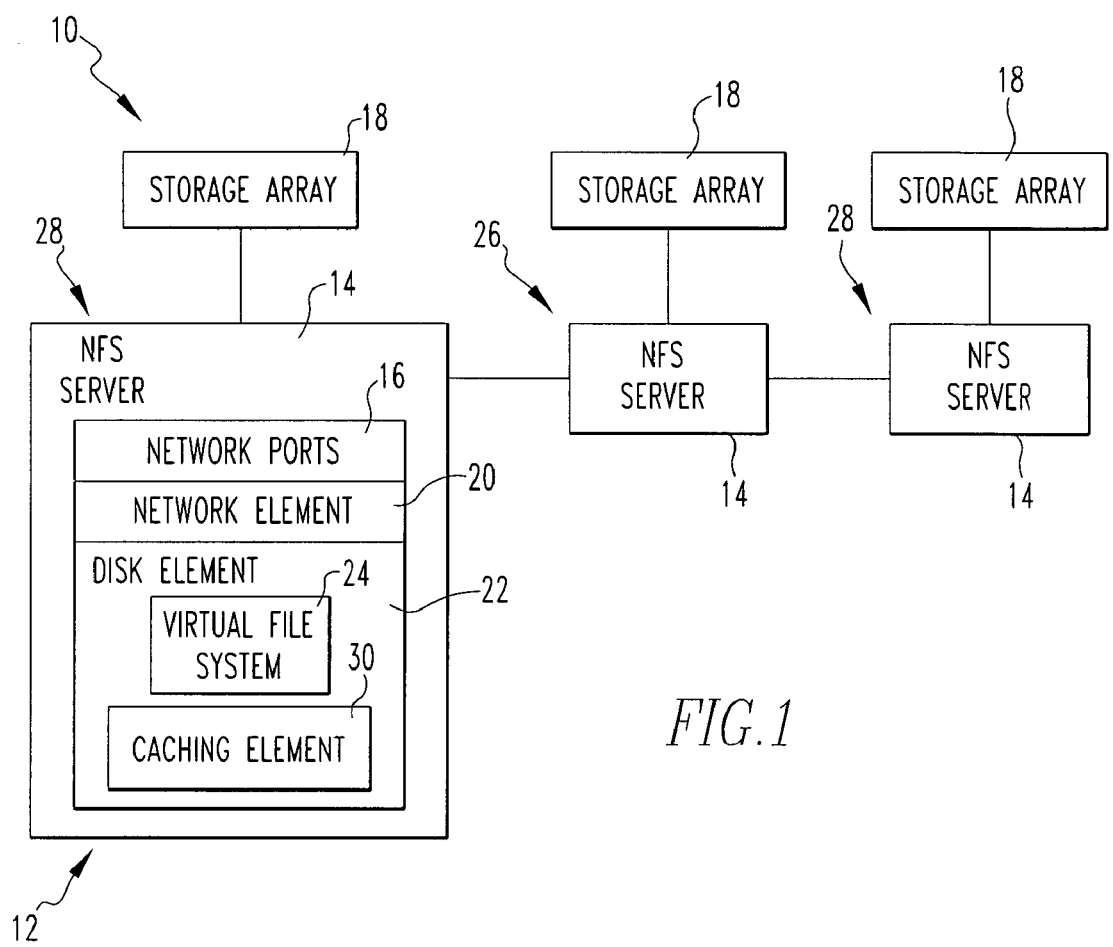
FIG. 1 is a schematic representation of an apparatus of the present invention.

Referring now to the drawings wherein like reference numerals refer to similar or identical parts throughout the several views, and more specifically to figure thereof, there is shown an apparatus 10 for data storage. The apparatus 10 comprises a cluster 12 of NFS servers 14. Each server 14 has network ports 16 for incoming file system requests and cluster 12 traffic between servers 14. The apparatus 10 comprises a plurality of storage arrays 18 in communication with the servers 14, the servers 14 utilizing a striped file system for storing data.

Preferably, each server 14 has a network element 20 and a disk element 22. Each disk element 22 preferably has a virtual file system 24 with the virtual file system 24 of each disk element 22 together forming a striped VFS. Preferably, one disk element 22 for a virtual file system 24 acts as a meta-data server 26.

Preferably, a file has attributes and each server 14 for each file maintains a caching element that stores a last known version of the file attributes and ranges of modification time and change time values for assignment to write operation results. Each disk element 22 which is not the meta-data server 26 for a virtual file system 24 is preferably an input output secondary. Preferably, ranges of file modification times or file change times are reserved from the meta-data server 26 by the input output secondary. The modification and change times in the ranges obtained from the meta-data server 26 are preferably issued to operations already queued at the input output secondary.

Preferably, modification and change times in the ranges obtained from the meta-data server 26 are issued to operations received during a window of time after the ranges are reserved from the meta-data server 26 by the input output secondary. Operations affecting all stripes of a file preferably begin executions first at the meta-data server 26 for a file, and then execute at all input output secondaries 28, such that operations at the input output secondaries 28 wait only for already executing operations that have already finished their communication with the meta-data server 26.

Preferably, operations follow one of at least two locking models, the first of which is to synchronize first with the meta-data server 26, then begin core execution by synchronizing with other operations executing at the input output secondary, and the second of which is to first synchronize at the meta-data server 26, and then to synchronize with operations at one or more input output secondaries 28 that have begun core execution at the input output secondaries 28. The cluster 12 network is preferably connected in a star topology. Preferably, the cluster 12 network is a switched Ethernet.

The present invention pertains to a method for data storage. The method comprises the steps of creating a file across a plurality of NFS servers 14. There is the step of writing data into the file as strips of the data in the servers 14, the strips together forming a stripe. There is the step of reading strips of the data from the servers 14. There is the step of deleting the strips from the servers 14.

Preferably, there is the step of identifying a disk element 22 for a virtual file system 24 of an NFS server 14 as a meta-data server 26 and disk elements 22 for the NFS severs which are not identified as the meta-data server 26 as input output secondaries 28. There is preferably the step of storing in a caching element at each input output secondary for each active file at a meta-data server 26 a last known version of attributes of the file which are good for a dallying period. Preferably, there is the step of the step of storing ranges of modification time and change time values in the caching element for assignment to write operations.

There is preferably the step of making a status request by the caching element to the meta-data server 26 to obtain a file's current attributes. Preferably, the making a status request step includes the step of obtaining modification time and change time ranges from the meta-data server 26. There is preferably the step of queuing file read and file write requests at the input output secondary until the file read and file write requests are admitted by the cache element and complete execution.

Preferably, there is the step of tracking by the cache element which file read and file write requests are executing for the file and which ranges are being read or written. There is preferably the step of requesting the cache element move out of invalid mode to read mode when a read operation must be executed. Preferably, there is the step of the step of checking a byte range affected by a file read request to ensure it does not overlap a byte range of any file write requests previously admitted and currently executing. There is preferably the step of requesting in response to a file write request that the cache element move into a write mode. Preferably, there is the step of the step of checking with the cache element the byte range affected by the file write request for overlap with any admitted and still executing file read or file write requests.

There is preferably the step, when executing a write request, of allocating a modification time and change time pair from the range of modification times and change times stored in the cache element. Preferably, there is the step of checking the head of a queue of pending file read and file write requests to see if the head can be admitted by the caching element after either a file read or file write request is completed. There are preferably the steps of detecting by the cache element that a file length must be updated in response to a file write request, moving the cache element into exclusive mode; and making a file write status call to the meta-data server 26 to update length attributes of the file.

The present invention pertains to a method for establishing storage for a file. The method comprises the steps of receiving an NFS create request at a network element 20. There is the step of receiving a file create request at a meta-data server 26 from the network element 20. There is the step of allocating an inode number for the file at the meta-data server 26. There is the step of making create calls to input output secondaries 28 to mark the file as allocated by the input output secondaries 28. There is the step of committing the file create at the meta-data server 26.

The present invention pertains to a method for removing a file from storage. The method comprises the steps of receiving a delete file request at a meta-data server 26. There is the step of removing a file name of the file from a parent directory by the meta-data server 26 at the meta-data server 26. There is the step of putting the file on a file delete list by the meta-data server 26 at the meta-data server 26. There is the step of sending delete calls to the input output secondaries 28. There is the step of receiving at the meta-data server 26 acknowledgment calls from the input output secondaries 28 that they have deleted the file. There is the step of removing the file at the meta-data server 26. There is the step of deleting the file from the file delete list. There is the step of placing an inode number associated with the file into a free list by the meta-data server 26 at the meta-data server 26.

The present invention pertains to a method for reading data in a file. The method comprises the steps of receiving an NFS read request for data in the file at a network element 20. There is the step of determining by the network element 20 which VFS stores at least one strip containing the data. There is the step of sending a file read request from the network element 20 to at least one disk element 22 of a plurality of servers 14 storing a strip of the data. There is the step of obtaining current attributes associated with the file by each disk element 22. There is the step of reading the strips of the file from each disk element 22 having the strips. There is the step of generating a response in regard to the file read request.

The present invention pertains to a method for writing data in a file. The method comprises the steps of receiving an NFS write request for a file at a network element 20. There is the step of determining by the network element 20 which VFS is associated with the file. There is the step of sending a file write request from the network element 20 to at least one disk element 22 of a plurality of servers 14 having a stripe of the VFS. There is the step of acquiring current attributes associated with the file. There is the step of writing a predetermined number of bytes of the data into each VFS strip in succession until all of the data is written into the file.

In the operation of the invention, it is implemented on top of a SpinServer, whose basic architecture is described by application number PCT/US01/46792, incorporated by reference herein. To recall, therein, a single global name space is implemented by a collection of network elements (NEs) 20 and disk elements (DEs) 22.

Figure 2:
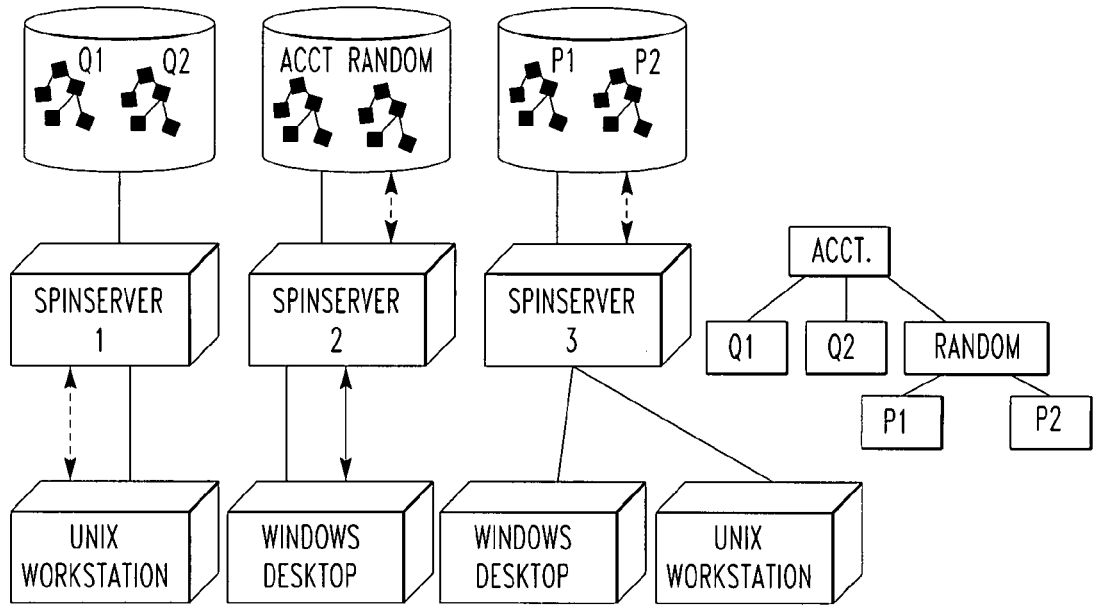
FIG. 2 is a schematic representation of the apparatus of the present invention.

In the preferred embodiment, a single NE and DE are combined in a server 14, having both network ports 16 for incoming file system requests and other network ports 16 for cluster 12 traffic between SpinServers, as drawn above. In FIG. 2, the links at the top of FIG. 2 represent fibrechannel links between the SpinServers and their attached storage arrays 18. The horizontal black lines represent the private cluster 12 network that connects the NE and DE components of different SpinServers together. Note that in FIG. 2, it appears that the cluster 12 link runs through SpinServer 2 to get to SpinServer 3, but in reality, the cluster 12 network is a switched gigabit Ethernet, with the machines connected in a star topology.

Assuming a system structured as described above, data is striped between multiple VFSes as a way of providing bandwidth from multiple DEs to what appears to be a single VFS.

Data within a VFS is implemented as an array of inodes, as described by patent application number PCT/US01/48741, incorporated by reference herein, or as implemented in the Berkeley Fast File System, whose design and full implementation is available at http://www.freebsd.org, incorporated by reference herein.

A striped VFS appears in the NFS name space as a single VFS, but is internally comprised of a set of strip VFSes, distributed among a number of DEs, one VFS per DE; this collection is called a striped VFS or a striped set. One server 14 for one of the VFSes is distinguished as the meta-data server 26, or MDS. Data is then distributed throughout the collection of VFSes as follows. All files in the striped VFS are represented at the MDS, and for all files except for regular data files, the MDS stores all of the data for the object. Thus, specifically, all directories, symbolic links, mount points, are stored completely at the MDS.

Data files are treated differently. Data files are striped among all the VFSes in a striped set, by putting different strips of the file's data in different VFSes in the striped set, all sharing the same vnode number within each striped VFS. For example, if it is denoted by A.B.C, the file with VFS ID A, vnode B within that VFS, and unique generation number C, then if the striped VFS A is made up of VFSes A1, A2 and A3, the various stripes of a file A.B.C is stored in the files with file IDs A1.B.C, A2.B.C and A3.B.C. That is, a file in a striped VFS with vnode B has its data stored in all of the component VFSes in the file with the same vnode and unique field in each component VFS. Strip N of vnode B is stored on the I-th server 14 in the stripe set, where $$I=(B+N) \bmod STRIPE\_WIDTH$$

and STRIPE_WIDTH is the number of strips in an entire stripe across all storage arrays 18 holding the striped VFS.

Figure 3:
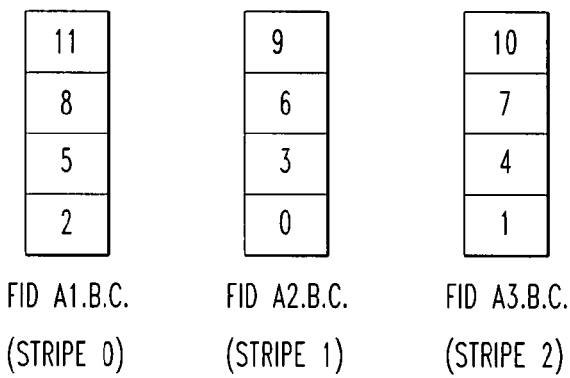
FIG. 3 is a representation of three strips.

FIG. 3 shows a file in a striped virtual file system 24 (VFS A), created from three individual VFSes A1, A2 and A3. The file's vnode number is B, and its unique field is C. Strip 0 of the combined file is stored in the first strip of file A2.B.C, strip 1 is stored in strip 0 of file A3.B.C, strip 2 is stored as strip 0 of file A1.B.C, and strip 3 of the combined file goes back to file A2.B.C, this time as strip 1 of the file.

Data is striped as per FIG. 3, X bytes on each server 14, and then move to the next server 14 for the next X bytes, over and over again. The strip size is X, and the stripe size is X*<number of servers>, that is, if 32 KB is written on each server 14, and then move to the next, and there are 8 servers participating in the cluster 12, then the strip size is 32K and the stripe size is 128K.

Most operations file system operations execute on the MDS, and the MDS alone performs attribute retrieval, directory lookup, symbolic link reading, directory reading, access checking, attribute setting (except for file length changes), directory creation, directory removal, file and directory renaming, locking, hard link creation, symbolic link creation, and access control list setting operations.

A number of other operations primarily affect a single strip, but that strip's processing of the request may require communication with the MDS; these include both read and write operations. Finally, normal file creation, file removal, and updating the length of a file all affect all of the files in a stripe set. The details of these operations are provided below.

All basic data operations except for spin_read and spin_write are handled at the MDS. Calls to spin_read, and spin_write are sent by the NE to the appropriate DE holding the appropriate strip of the file. As noted above, this strip is computed as a function of the relative strip within the data file, combined with the file's vnode number, so that the striping begins with a different server for different files within a striped VFS. It should be noted that specific requests are identified consistent with the nomenclature of the preferred embodiment, such as spin_read or spin_write. These requirements are representative of the more general request associated with it, such as a read request or a write request or a status request.

When an NFS read is received by an NE, the NE computes the real VFS storing the strip or strips containing the data being read, and then the NE sends the read requests to the DE (or DEs) storing the data. As part of executing the request, the DEs require the attributes associated with the file, and either use recently cached information or obtain it at the time from the MDS. This information is used to determine the file length, which is further used to trim file reads. It is also used to determine the file attributes to return to the caller of spin_read.

Figure 4:
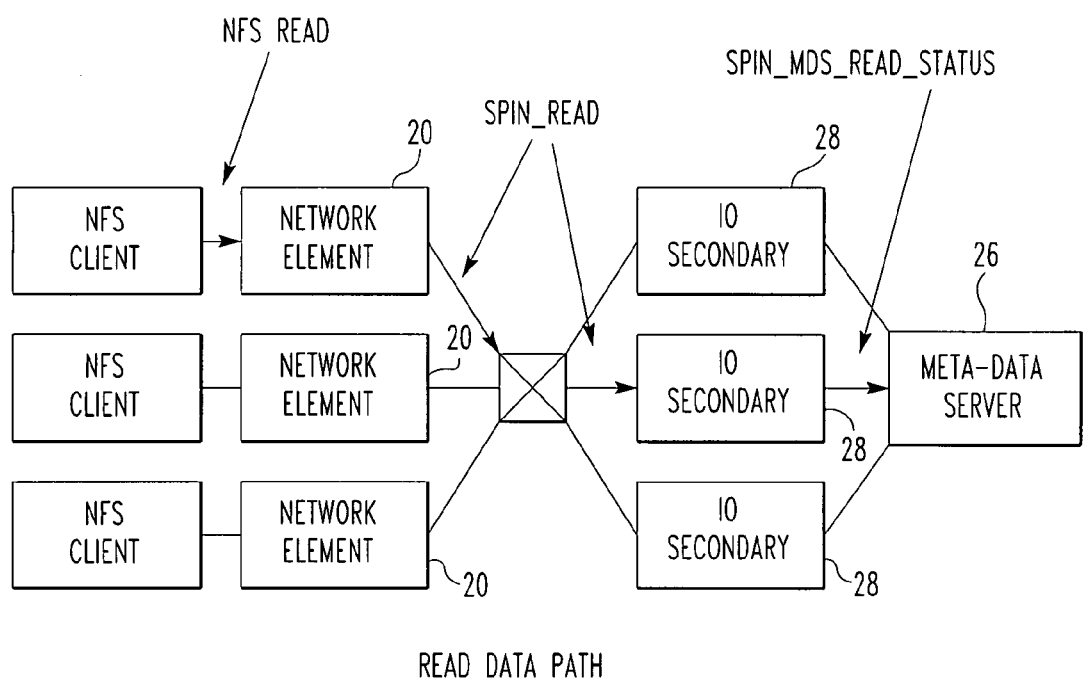
FIG. 4 is a schematic representation of a Read data Path, along with requests to the meta-data server.

FIG. 4 shows how this works. An NFS read request enters the NE from the left, and is mapped into the corresponding spin_read request for the corresponding stripe, stored on the second IOS from the top. If the cache attribute stored at this IOS is current, the read operation is executed immediately and a response generated. Otherwise, a spin_mds_read_status call is sent to the meta-data server (MDS) 26 to retrieve the current attributes for the file. The same path is used for write requests, with an NFS write request entering the NE, being translated to a spin_write call, and with the IOS calling the MDS with spin_mds_write_status if the cache element is unable to handle the request immediately. In addition, in the write case, if the file length is updated, the write call's spin_mds_write_status call updates the file length at the MDS.

A write works analogously to a read operation, in terms of determining the server 14 or servers 14 holding the data required to perform the write operation. A spin_write operation, when handled by a DE, will also need to update the file attributes stored at the MDS. This update is handled by sending a request from the IOS to the MDS; optimizations described below allow the IOS to handle more than one spin_write operation with a single status updating call to the MDS.

There are two calls an IOS can perform to the MDS. The spin_mds_read_status operation returns the current file attributes. The spin_mds_write_status operation returns the current file attributes, along with a range of mtime and ctime values the IOS can assign itself. The spin_mds_write_status call can also take optional attributes to write to the file before returning the updated attributes; this option is typically used for updating the file length when a spin_write call at the IOS actually needs to update the file length.

Each IOS maintains, for each active file at the MDS, a caching element that stores the last known version of the file attributes, along with optional ranges of mtime and ctime values for assignment to write operations. At the IOS, this caching element processes queued read and write operations (spin_read and spin_write calls), as follows. File attributes are cached, and are good for a certain (short) period after they are obtained from the MDS, called the dallying period. If the cache element is in read mode, it has cached file attributes, but no range of mtimes and ctimes for use by writes. If the cache element is in write mode, it has cached file attributes as in read mode, but in addition has cached a range of mtime and ctime values for use by write operations. An element that has cached information that is too old to use is in invalid mode. A cache element moves from invalid mode to read mode by making a spin_mds_read_status call to obtain the latest attributes from the MDS. A cache element in either invalid or read mode can move to write mode by calling spin_mds_write_status to obtain current attributes along with mtime and ctime ranges.

The mtime is the file's modification time, which means that it is the time at which the data in the file was last modified. The ctime is the file's change time, which advances when any property of the file changes, including its data. So, if you do a write to a file, both its mtime and ctimes change, but if you do an operation on the file like change its protection or file owner, only the ctime changes. The ctime always changes if the mtime changes, but the mtime does not change every time that the ctime changes.

All spin_read and spin_write calls at an IOS have to gain admission to the cache element before they can execute at the IOS; until they have been admitted, they are queued at the cache element. The cache element tracks which spin_read or spin_write operations are executing for the corresponding file, and which ranges the operations are reading or writing. A queued spin_read call first requests that the cache element move out of invalid mode into read mode, if the element is in invalid mode. Once the element is in either read or write mode, the byte range affected by the spin_read call is checked to ensure that it does not overlap the byte range of any spin_write calls that have been previously admitted and that are currently executing. If this condition passes as well, the spin_read call is admitted, and will complete with the attributes currently stored in the cache element. A queued spin_write call requests that the cache element move into write mode. It then checks the byte range affected by the spin_write call for overlap by any admitted and still executing spin_read or spin_write calls. If there are no conflicting calls, the spin_write call is admitted, and an mtime/ctime pair is allocated from the range stored in the cache element, and the spin_write executes locally. When the spin_write call completes, the response is sent using the allocated mtime/ctime pair. Whenever either a spin_read or a spin_write call completes, the head of the queue of pending spin_read and spin_write requests is checked to see if it can be admitted, and new calls are admitted until a call is encountered that conflicts with the currently running set of spin_read and spin_write calls.

A write call that gets admitted to the cache element may detect that it must update the file length as well. In this case, the cache element is moved into exclusive mode, which requires that all other operations complete before the spin_write operation can proceed. After all the operations complete, a spin_mds_write_status call is made that updates the file length attributes and returns a new range of mtime and ctime values, and the write operation proceeds.

Figure 5:
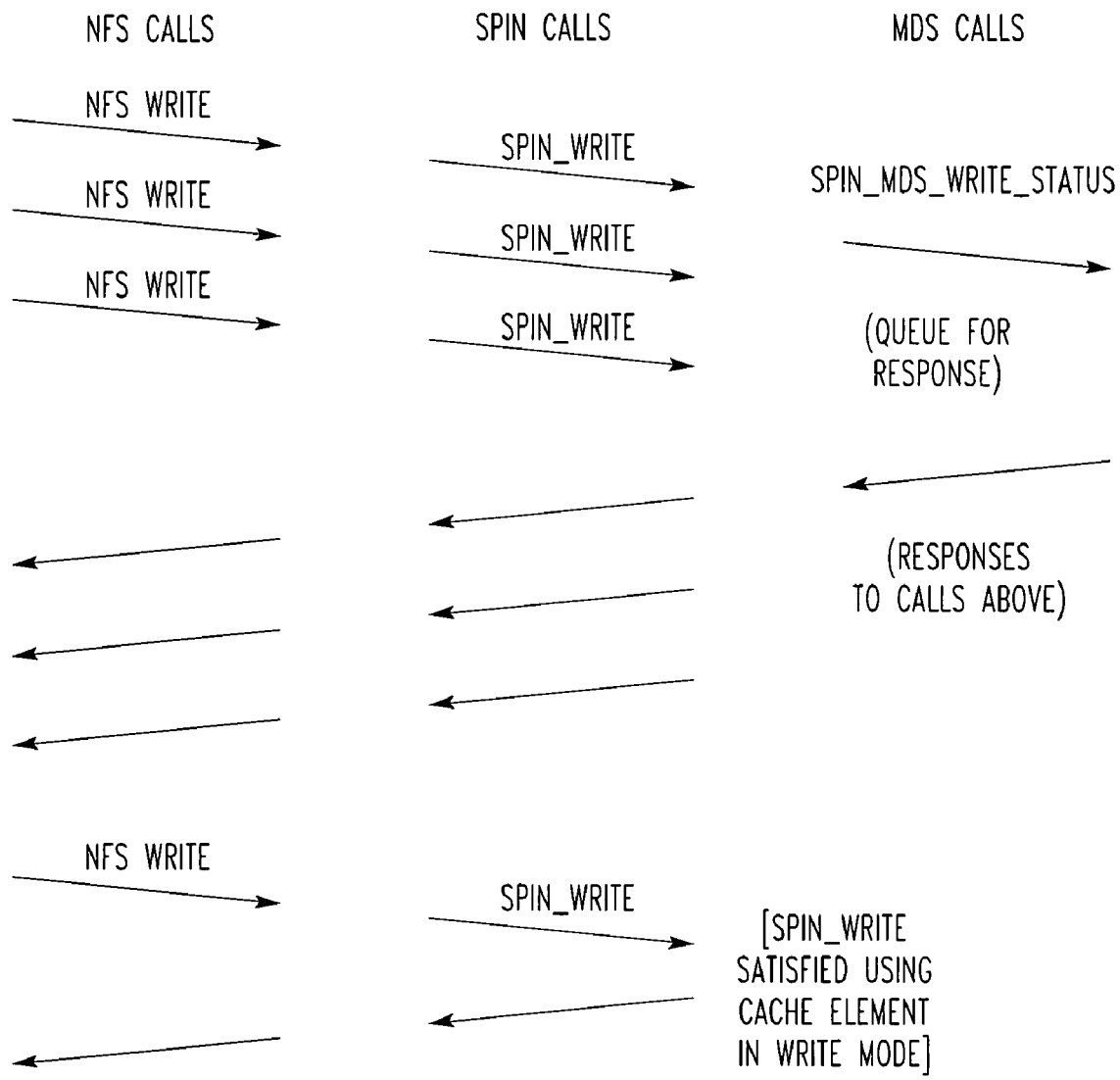
FIG. 5 shows calls exchanged as part of performing a write operation in a striped system.

FIG. 5 shows the calls exchanged as part of performing a spin_write operation in a striped system. In this example, three NFS write calls arrive at an NE, which sends the three corresponding spin_write calls to an IOS. The IOS's cache element is not in write mode, so it makes a spin_mds_write_status call to the MDS to put the element into write mode. During this time, other spin_write calls to the IOS are queued awaiting the cache element moving into write mode.

Figure 6:
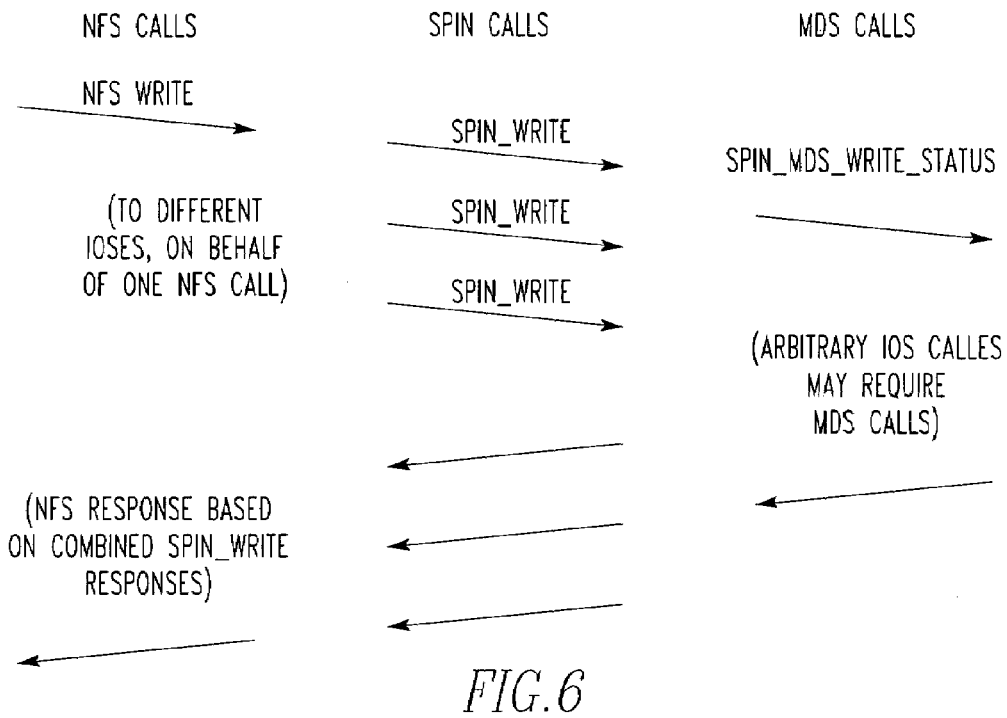
FIG. 6 shows the results of multiple calls to various disk elements being combined before the network element can generate an appropriate NFS response.

Certain read and write calls to a network element 20 cross strip boundaries in the file system. Typically, this occurs on large NFS read or write calls that happen to span a strip boundary by chance. In this case, the results of multiple SpinFS calls to various disk elements 22 are combined before the NE can generate the appropriate NFS response. FIG. 6 illustrates this case.

There are two approaches that can be used in these cases. In the first approach, two or more DE spin_read or spin_write operations are performed, one for each affected strip, and combine the results before returning the results to the client. The operation used to combine the multiple sets of attributes is to return the attributes associated with the status entry having the oldest (smallest) ctime field. In the second, the fact that NFSv3 and NFSv4 operations can perform short read or write operations are taken advantage of, and perform only the part of a read or write operation that fits within the first affected strip, and return an indication from the NE to the NFS client that only a subset of the data has been transferred. In this case, it is known that the client will send another request for the remaining data.

The preferred implementation actually uses a hybrid approach, depending upon the underlying access protocol. Specifically, for protocols that allow the server 14 to perform a read or write for fewer bytes than requested, with the storage client having the responsibility for requesting a new transfer for the remaining bytes, the server 14 will implement the second approach described above. For the remaining protocols, which require all bytes to be transferred for each call, the first approach is used. Using short reads and writes when possible allows the storage clients to track more accurately the exact version of data in each page of their cache, and so prevents unnecessary cache invalidation operations at the storage client.

Two classes of operations are performed at the MDS, but also affect the IOSes in the system. One class includes file creation and deletion operations, and the second class includes file truncation. Both classes are described below.

Figure 7:
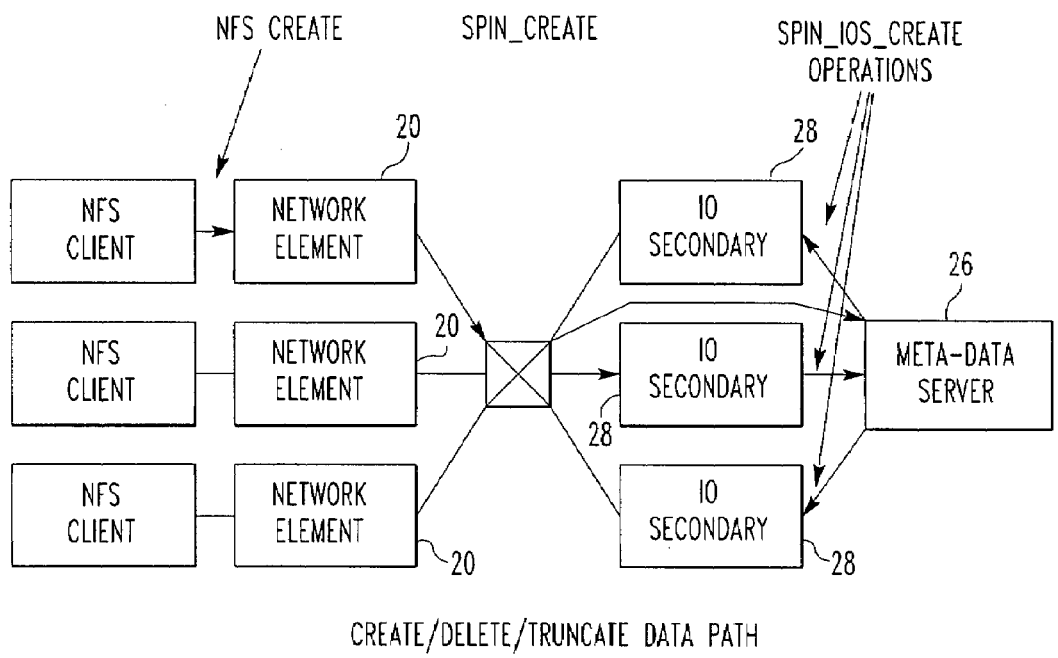
FIG. 7 is a schematic representation of Create/Delete/Truncate communications.

Multi-strip operations are directed to the MDS, which sends out requests to the various IOSes involved in the operation. As with all the other operations in this system, they are serialized by their file ctime values. The reader can see the path that these operations take through the system is shown in FIG. 7. There, an NFS create request is received by an NE, which translates it to a spin_create call, which is forwarded to the MDS (rightmost box). The MDS performs this operation by issuing a number of spin_ios_create operations to all of the IOSes storing the VFS strips in question. Note that in the figure below, the spin_ios_create calls move from right to left, as opposed to the other calls involved in this operation.

File create and delete operations affect multiple strips, and are sent directly to the MDS, which drives their processing as follows.

File creation is quite straightforward. For a striped VFS, before actually doing the creation, the inode number that will be used is reserved, and spin_ios_create calls are made to the IOSes. The spin_ios_create call ensures that there is no data left in the specified file, that the file inode has the same unique field on the IOS as is stored on the MDS, and that the file's file type field indicates that the file is a regular file. The spin_ios_create calls are performed before the MDS commits the transaction that allocates the inode allocation, so that in the case of a crash before the inode has been created at each IOS, there are no changes made at the MDS, and the file allocation will eventually start from scratch.

In the event of a crash at any site, the file create will fail before any file entry is created, and before any inodes are marked as allocated at the MDS. Thus, retrying the create will succeed without any resources having been lost by the failed attempt at file creation. Also note that by the time the created file finally becomes visible, with the directory entry having been created and the inode unlocked at the MDS, the file has been created on the MDS and all IOSes. Thus, there are no windows in which a partially created striped file is visible, even in the event of an MDS or IOS crash.

Delete follows the same rule as create, ensuring that the transactional update that destroys the directory entry and frees the regular file inode executes as the very last stage in the file delete operation. That is, a file delete begins by sending a spin_ios_delete call to each of the remote VFSes (performing the spin_io_delete calls in parallel). Once those calls complete, the strip at the MDS is removed transactionally, and the file is gone.

One complication that arises in file deletion that does not occur in file creation is that, since the file already exists at the start of the operation, intermediate states during the deletion will be visible to anyone who executes read or write operations during the delete. Typically, this means that during a delete, a read or write operation may, instead of just blocking and then returning ESTALE, may return ESTALE during the delete. That in and of itself is not a problem, but if the MDS crashes during this phase, then upon recovery, some of the strips will appear to be deleted, and will return ESTALE upon reads of that byte range, while others will still function. A new file delete operation will succeed, but the overall state of this file will lead to user confusion.

Thus, before starting the file delete operation, a transaction is committed that adds the file to a list of objects that are in the process of being deleted, and removes it from its parent directory. The system then sends spin_ios_delete calls to all IOSes, and finally, performs a second transaction that removes the file from the MDS and from the list of files being deleted. Since the file is recorded as "to be deleted" in stable storage before the spin_remove call makes any changes at all, it is guaranteed that the file will eventually be deleted if it is ever started to be removed. Thus, any ESTALE errors due to accessing a file in the process of being deleted will be short-lived, and will occur only after the file is no longer visible in its parent directory.

The spin_ios_create and spin_ios_delete calls require the cache element on the IOS for the file involved to be in exclusive mode. Effectively, this means that these operations wait for all admitted operations for this file to complete before spin_ios_create or spin_ios_delete can execute at the IOS.

File truncation is similar to file deletion, executing both at the MDS and at the various IOSes. It is desired for the truncate to be serializable with respect to the other operations at the IOSes. Specifically, if a truncate comes back with mtime 200, and a write executes at an IOS returning mtime 199, the data written at that IOS must reflect the effects of the truncate as well. On the other hand, if the write executes returning an mtime of 201, the write should not appear affected by the truncate.

This is accomplished by serializing truncations at the MDS, in the same way that file create and delete operations are serialized at the MDS. Specifically, spin_setattr executes at the MDS, blocking incoming spin_mds_read_status and spin_mds_write_status calls for the duration of its execution. During this time, it performs the truncate operation at the MDS, and sends a spin_ios_truncate operation to all of the IOSes. The spin_ios_truncate operation actually performs the truncate operation at the IOS.

The IOS processes a spin_ios_truncate operation as follows. First, all already admitted operations at the IOS complete; these operations executed based upon mtime and ctime values already obtained from the MDS, and are serialized before the truncate operation. Next, the truncate operation is performed. The spin_ios_truncate call's parameters include the file ID of the file being truncated, as well as its new length, and the attributes of the file after the truncation is performed, including updated mtime and ctime fields. After performing the truncate operation, the cache entry will be in read mode, and additional operations at the IOS queued for state changes in the cache entry can proceed.

To avoid deadlocks for thread resources within DE elements in this design, two additional pools of threads are reserved for processing incoming requests at each of the IOS and MDS.

Since any system can be both an MDS and an IOS at the same time (for different virtual file systems 24), enough thread resources are reserved to ensure that at least one request sent from IOSes to MDSes can be executed, and to ensure that at least one request from MDSes to IOSes can be executed. Specifically, at least one thread is reserved for handling incoming spin_mds_read_status and spin_mds_write_status calls, and only those calls, and another thread is reserved that handles spin_ios_create, spin_ios_delete and spin_ios_truncate calls, and only those calls.

This section contains a walk-though example of the operation of the striped system described above.

It starts with a file create, followed by a number of striped writes, followed by a number of striped reads, and finishes with a file delete.

The initial file create begins at the MDS, which begins by allocating a vnode number for the new file. The MDS then makes spin_ios_create calls to all of the IOSes concurrently, marking the file as allocated on all of the IOSes. Once the spin_ios_create calls complete, the transaction at the MDS that actually creates the file at the MDS commits, and those changes are permanent.

After creating a file, multiple machines can write to that file. Assume for concreteness that there are three servers, I0, I1 and I2, with I0 being the meta-data server 26 for the file. Assume clients C0 and C1 are writing to the file. A time is represented as a 64 bit quantity giving the number of nanoseconds since Jan. 1, 1970. At the time the file is created, its mtime and ctime values are both the same, say 1000000. Assume that C0 then does 50 spin_write calls for a strip stored at I1. I1 first moves to write mode, and receives a range of mtime and ctime values from I0. In this case, assume that the current time at the time the write arrives at I1 is 2000000, so that the MDS grants I1 1000 values in its mtime and ctime ranges by specifying that the mtime and ctime ranges for I1 are 2000000-2000999. The MDS then sets the file's mtime and ctime to 2001000. The 50 writes are assigned 50 distinct mtime and ctime pairs, starting at 2000000 for both mtime and ctime, and ending with 2000049 for both mtime and ctime. During the processing of these writes, C0 and C1 might send another 50 writes for one or more strips stored at I2. I2 as an IOS must move to write mode as well, and does so by calling spin_mds_write_status to obtain its own set of mtime and ctime values. Since the MDS has advanced the time stamps to 2001000 when putting I1 into write mode, the ranges returned to I2 are 2001000 through 2001999. The 50 writes are then performed at I2, and are given mtime and ctime values of 2001000 through 2001049 by I2. Note that 100 write operations have been executed on I1 and I2, at the cost of only two simple RPCs to I0.

Next, assume that 50 read operations are sent from clients C0 and C1 to IOS I1. When the first read of the set arrives at I1, assume that it finds that the maximum time the IOS may remain in write mode has expired, and the IOS is back in idle state. Processing the spin_read calls requires that the IOS be in read mode, which it accomplishes by sending a spin_mds read status call to the MDS. This call returns the current attributes, including the current file mtime and ctime values of 2002000. After the completion of the spin_mds_read_status call, the IOS I1 is able to return mtime and ctime values of 2002000 until the dallying period has expired. In this example, assuming all of those read operations arrive before the dallying period has expired, all of the spin_read operations return attributes indicating the file has mtime and ctime values of 2002000.

Note that in this example, all of the operations are serialized by ctime. That is, all of the writes to the strip at I1 are serialized before any of the writes to strip I2, which themselves are serialized before any of the reads performed at I1.

Finally, when the file is deleted, the MDS receives the spin_remove call which triggers the deletion. The MDS removes the file name from parent directory, puts the file into a list on stable storage of files being deleted, and commits the transaction. From this point, the file will eventually be deleted on the MDS and all I0Ses, even in the case of multiple system crashes. The MDS then performs the second phase of deletion, sending spin_ios_delete operations to all of the I0Ses, in parallel. After every I0S acknowledges successful execution of the spin_ios_delete call the file is destroyed at the MDS and the inode put back in the free list at the MDS.

The technique described above solves the problem of providing shared file access for a compute cluster 12 comprised of many independent processors connected via a high speed network, because it allows the creation of a cluster 12 of NAS servers 14 that provides extremely high read or write performance to a single file.

With respect to read or write performance, for example, if an administrator needs 100 servers of performance to a single file, the administrator simply stripes the VFS containing the desired file across 100 servers. Each network element 20 on each server 14 has approximately $1/100^{th}$ of the aggregate load to the file, and each disk element 22 on each server 14 also has approximately $1/100^{th}$ of the aggregate load to the file, so the load on all of the I0Ses is distributed very evenly. The load on the MDS can be estimated as follows: with 5000 clients, each IOS has perhaps 50 clients accessing it at any one time. Each client has perhaps 8-16 IO requests outstanding at any instant, which means that the IOS has between 400 and 800 requests queued at any instant. If there is one spin_mds_read_status or spin_mds_write_status call for every 100 queued requests, and each request is an 8K read or write operation, then each call to the MDS from an IOS corresponds to about 800 KB of data transfer. If the MDS can handle, conservatively, 25,000 spin_mds_read_status or spin_mds_write_status calls/second, then the aggregate bandwidth supported to the single file is about 25,000*800 KB or 20 gigabytes/second. This is the equivalent of 160 gigabit Ethernet ports, and is well above the performance of any clustered NFS server 14 system made of comparable technology.

In a preferred embodiment, the apparatus 10 runs on a dual processor Intel PC with 4 GB of main memory. The apparatus 10 has 4 gigabit ethernet cards, 2 user ports for incoming NFS requests and 2 cluster 12 ports for communication with other NFS servers 14 in the cluster 12. The calls that go over the cluster 12 ports are the spin_read, spin_write, spin_create and spin_delete calls (from a network element 20 to a disk element 22), as well as the spin_ios_XXX and spin_mds_XXX calls (from a disk element 22 to another disk element 22). Each system also has 4 GB of main memory, which it uses for caching file data as well as general program memory.

The apparatus 10 runs on a dual processor, and although this isn't required, the network element 20 code is run on one of the CPUs and the disk element 22 code and the clustering code on the other CPU. The network element 20 processor thus runs the NFS and CIFS server code, while the disk element 22 processor runs the MDS and IOS code (possibly at the same time for different virtual file systems 24).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for data storage comprising the steps of:

creating a file across a plurality of NFS (Network File System) servers, where each server can be either a data server or a meta-data server, each server having a network element and a disk element;

storing in a caching element at each input output secondary of each active file at the meta-data server a last known version of attributes of the active file which are good for a dallying period;

moving the caching element out of invalid mode to read mode when a read operation must be executed by making a status request by the caching element to the meta-data server to obtain a file's current attributes and a latest attributes status;

requesting the caching element out of invalid mode to read mode when a read operation must be executed;

writing data into the file as strips of the data in the data servers, the strips together forming a stripe for providing bandwidth to multiple disk elements, where a striped file system comprises a set of striped VFSes (virtual file systems) distributed among a number of disk elements of a cluster of servers, with one VFS of the set of striped VFSes per disk element;

reading the strips of the data from the data servers; and deleting the strips from the data servers.

2. A method for data storage comprising the steps of:

creating a file across a plurality of NFS (Network File System) servers where each server can be either a data server or a meta-data server, each server having a network element and a disk element;

writing data into the file as strips of the data in the data servers, the strips together forming a stripe for providing bandwidth to multiple disk elements, where a striped file system comprises a set of striped VFSes (virtual file systems) distributed among a number of disk elements of a cluster of servers, with one VFS of the set of striped VFSes per disk element;

storing in a caching element at each input output secondary for each active file at the meta-data server a last known version of attributes of the active file which are good for a dallying period;

storing ranges of modification time and change time values in the caching element for assignment to write operations;

identifying a disk element for a virtual file system of an NFS server as a meta-data server and disk elements for the NFS servers which are not identified as the meta-data server as input output secondaries;

queuing file read and file write requests at the input output secondary until the file read and file write requests are admitted by the cache element and complete execution;

tracking by the caching element of the file read and file write requests executing for the file and the ranges that are being read or written;

moving the caching element out of invalid mode to read mode when a read operation must be executed by making a status request by a caching element to the meta-data server to obtain a file's current attributes and a latest attributes status;

once the caching element is in read mode, checking a byte range affected by a file read request to ensure it does not overlap a byte range of any file write requests previously admitted and currently executing, and if this condition is met, the file read request is admitted;

reading the strips of the data from the data servers; and deleting the strips from the data servers.

3. A method for data storage comprising the steps of:

creating a file across a plurality of NFS (Network File System) servers "where each server can be either a data server or a meta-data server", each server having a network element and a disk element;

writing data into the file as strips of the data in the data servers, the strips together forming a stripe for providing bandwidth to multiple disk elements, where a striped file system comprises a set of striped VFSes (virtual file systems) distributed among a number of disk elements of a cluster of servers, with one VFS of the set of striped VFSes per disk element;

storing in a caching element at each input output secondary for each active file at the meta-data server a last known version of attributes of the active file which are good for a dallying period;

requesting, in response to a file write request that the cache element moves out of an invalid mode into a write mode by obtaining from a meta-data server current attributes, modified times and change times range;

once the caching element is in the write mode, checking with the cache element the byte range affected by the file write request for overlap with any admitted and still executing file read or file write requests, and if the byte range effected by the file write request does not overlap, then the file write request is admitted;

when executing the write request, allocating a modification time and change time pair from a range of modification times and change times stored in the cache element;

checking the head of a queue of pending file read and file write requests to see if a head request can be admitted by the caching element after either the file read or file write request is completed and will complete and the head request is admitted with the attribute currently stored in the caching element if there is no conflict with any other admitted and still executing file read or file write requests;

reading the strips of the data from the data servers; and deleting the strips from the data servers.

* * * * *

UNITED STATES PATENT AND TRADEMARK OFFICE
CERTIFICATE OF CORRECTION

| | | |
|---|---|---|
| PATENT NO. | : 7,454,567 B2 | Page 1 of 1 |
| APPLICATION NO. | : 11/888166 | |
| DATED | : November 18, 2008 | |
| INVENTOR(S) | : Michael L. Kazar and Richard N. Sanzi | |

It is certified that error appears in the above-identified patent and that said Letters Patent is hereby corrected as shown below:

On The Title Page, insert Item (62)
    -- Related U.S. Application Data
Continuation of Application No. 10/727,169, filed Dec. 2, 2003 --

Signed and Sealed this
Thirty-first Day of May, 2016

Michelle K. Lee
*Director of the United States Patent and Trademark Office*